May 26, 1970      G. S. ECKELS      3,513,966

CONVEYOR BELT STABILIZER

Filed June 26, 1968      2 Sheets-Sheet 1

GEORGE S. ECKELS
INVENTOR.

BY *[signature]*

ATTORNEY

May 26, 1970 G. S. ECKELS 3,513,966
CONVEYOR BELT STABILIZER
Filed June 26, 1968 2 Sheets-Sheet 2
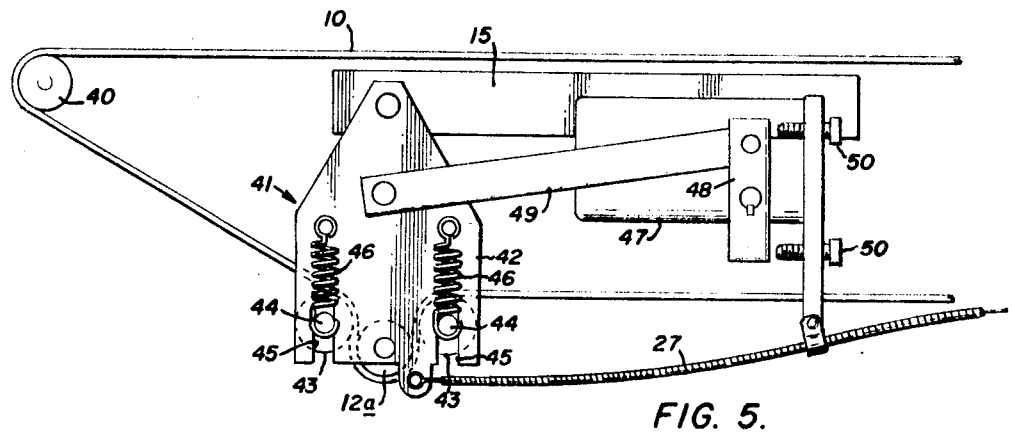
FIG. 5.
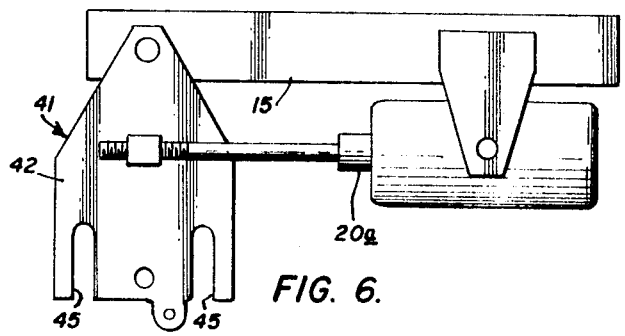
FIG. 6.
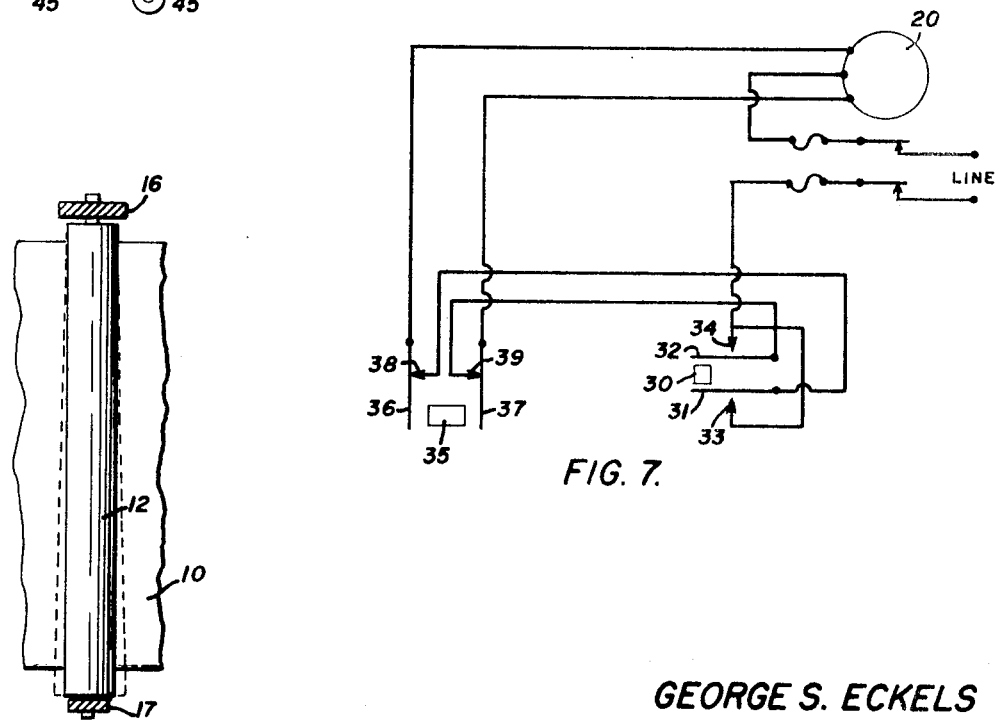
FIG. 4.
FIG. 7.
GEORGE S. ECKELS
INVENTOR.
BY Herbert J. Brown
ATTORNEY United States Patent Office 3,513,966
Patented May 26, 1970

3,513,966
CONVEYOR BELT STABILIZER
George S. Eckels, 8013 Chaparral Drive,
Fort Worth, Tex. 76108
Filed June 26, 1968, Ser. No. 740,378
Int. Cl. B65g 15/62; B65h 25/26; F16h 7/10
U.S. Cl. 198—202
3 Claims

ABSTRACT OF THE DISCLOSURE

A conveyor belt stabilizer utilizing automatic angular adjustment of a roller to hold the belt in line within narrow limits, the roller being oscillated by a linear actuator controlled by a mechanical sensing device contacting the edge of the belt.

---

This invention relates to conveyor belt stabilizers or tracking devices which are designed to hold the belt in line on the support and drive pulleys where it is necessary to use uncrowned cylindrical pulleys without flanges. While directed primarily to a cooling conveyor belt used in candy making, it is adaptable to any conveyor belt system wherein a relatively wide flat belt must be held within narrow limits of alignment for long periods without manual adjustment and wherein misalignment of the belt could cause disruption of the process using the belt or damage to the belt and surrounding equipment or structure.

One object of the invention is to provide a stabilizer that is simple in construction and is rugged and reliable in its use.

Another object of the invention is to provide a belt stabilizer that will operate over long periods without attention or manual adjustment.

A further object of the invention is to provide a stabilizer that has built-in limitations to the misalignment of the conveyor belt which make it partically impossible for the belt to damage itself or surrounding equipment.

In the accompanying drawing:

FIG. 4 is a plan view of the oscillating roller used in one form of the invention.

FIG. 5 is a broken side elevational view of a second form of the invention.

FIG. 6 is a partial side elevational view of a variation on a second form of the invention, and FIG. 7 is a wiring diagram of the circuitry used in the invention.

Figure 1:
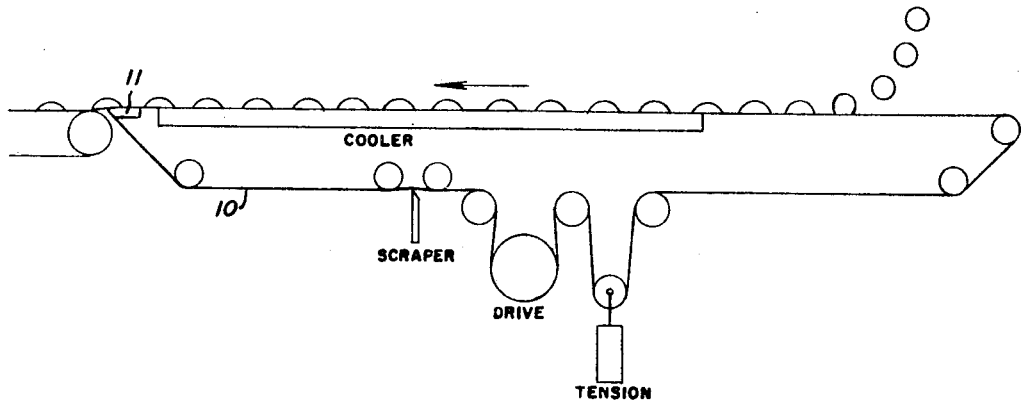
FIG. 1 is a side elevational diagram of a typical conveyor system to which the present invention can be applied.

Referring to FIG. 1, the conveyor system for which this invention is primarily adapted serves the purpose of receiving dipped chocolates which are in a soft condition and carries them over a refrigerated plate on the under side of the conveyor belt, thus hardening them so that they can be handled and packaged. As the conveyor belt, which is of relatively flexible material, bends sharply around either a fixed edge or small diameter roller at the end of the cooling cycle, the hardened candies break loose from the conveyor belt and drop onto a second receiving conveyor by which they are transferred to a packaging area. As the conveyor belt returns on its lower reach it passes over a scraper which cleans off any build up of chocolate or other ingredients.

Figure 2:
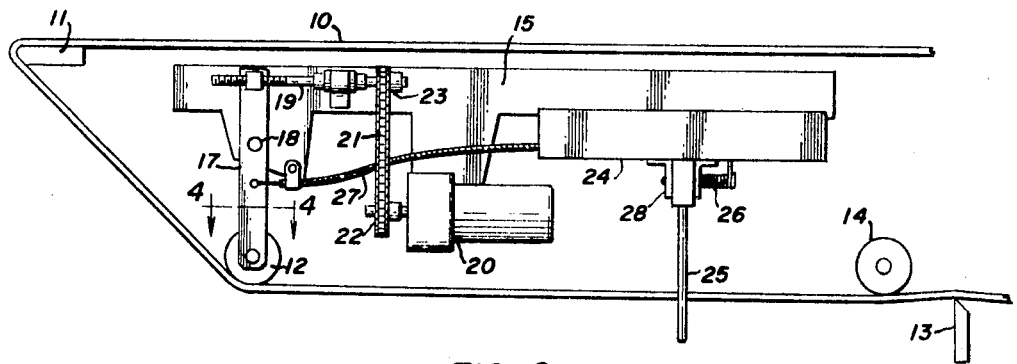
FIG. 2 is a broken side elevational view of one form of the invention.

In the simplified form of the invention, illustrated in FIG. 2, the conveyor belt 10 returns over a fixed edge 11 in an acute bend which releases the hardened candy from the belt. It then makes an obtuse bend around a relatively small diameter roller 12 and continues on its lower reach past a scraper 13 against which it is pressured by a pair of rollers 14. A portion 15 of the supporting structure of the conveyor is provided with a fixed depending arm 16 (FIG. 4) and a pivoted depending arm 17 to which the roller 12 is journaled. This allows the roller 14 to oscillate in a horizontal direction as indicated by the dotted lines in FIG. 4.

The depending arm 17 is attached to the supporting structure 15 by a pivot 18 and its upper end runs on a linear actuator 19 driven by a reversing gear motor 20 through a chain 21 and sprockets 33 and 23. A switch box 24, also attached to the supporting structure 15, contains microswitches operated by a sensing bar 25 caused to bear against the edge of the belt 10 by a light spring 26, and a push-pull cable 27 attached to the depending arm 17 as hereinafter described.

The sensing bar 25 is pivotally mounted on the bottom of the switch box 24 by means of a bracket 28 and extends upwardly into the switch box 24 through an opening 29. The upper extension 30 of the sensing bar 25 is set between the opposed triggers 31 and 32 of a pair of normally open micro-switches 33 and 34, respectively. The hooked end 35 of the push-pull cable 27 is similarly set between the opposed triggers 36 and 37 of a pair of normally closed microswitches 38 and 39, respectively.

Figure 3:
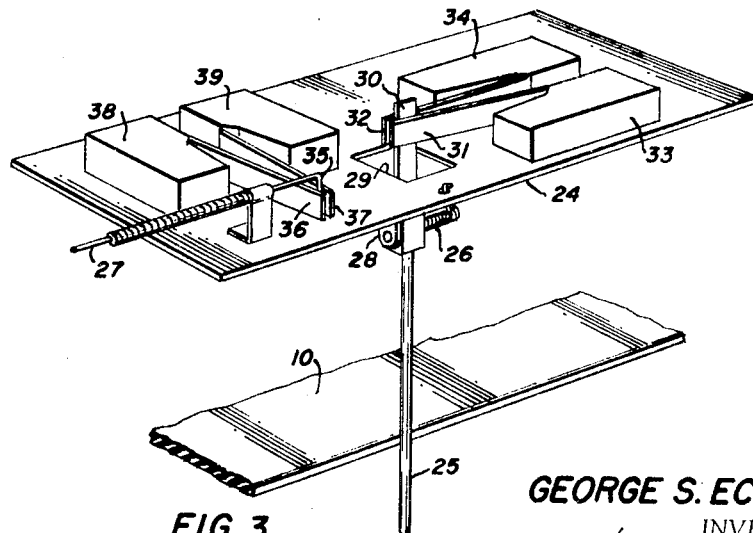
FIG. 3 is a perspective view of the switching arrangement used in the invention.

When the edge of the belt 10 moves the sensing bar 25 enough to cause its upper extension 30 to close the switch 34 (FIGS. 3 and 7) the gear motor 20 starts, moving the depending arm 17 and swinging the roller 17 out of line, thus causing the belt to start moving away from the sensing bar 25. The motion of the depending arm 17 is transferred to the hooked end 35 of the push-pull cable 27 and the spacing of the triggers 36 and 37 is pre-set to limit the extent of the re-alignment of the roller 12. As soon as the roller 12 reaches the proper limit of re-alignment the switch 39 opens and stops the gear motor 20. The belt is now moving away from the sensing bar 25 which follows it under pressure of the spring 26. Within a fraction of an inch of motion the bar extension 30 closes the switch 34 and the gear motor 20 starts in the opposite direction moving the roller 12 until the push-pull cable 27 opens the switch 38 and stops the motor 20. This process continues indefinitely causing the belt 10 to "hunt" within very narrow limits on its supporting rollers.

Referring now to FIG. 5, it has been found that if a small roller 40 is substituted for the fixed edge 11 at the breakaway point of the conveyor system, the use of the roller 12 for realigning the belt 10 will not be wholly effective. A composite unit 41 comprising a pivoted depending arm 42 and a matching and opposite fixed depending arm (not shown) carrying an aligning roller 12a and a pair of spring loaded tension rollers 43 take the place of the tension means illustrated diagrammatically in FIG. 1. The shafts 44 of the rollers 43 are slidably mounted on the vertical slots 45 and produce the necessary tension on the belt 10 by means of springs 46. The composite unit 41 is caused to oscillate horizontally in exactly the same manner as the depending arm 17, with the same circuitry applied to an electric powered linear actuator 20a (FIG. 6). It can also be actuated by a pneumatic motor 47 operating through a bell crank 48 and a connecting rod 49. In the latter case, the leads from the microswitches 33, 34, 38 and 39 run to a pair of solenoid operated valves (not shown) which start and reverse the air motor 47. The maximum travel distance of the composite unit 41 is controlled by a pair of set screws 50 positioned opposite the bell crank 48.

What is claimed is:
1. In a stabilizer for a continuous, conveyor belt mounted on rollers arranged to provide a horizontal upper reach, a fixed vertical arm at one side of the belt and a pivoted vertical arm on the other side of the belt, both said arms being beneath the said upper reach, multiple rollers rotatably mounted between said arms and around which said belt is laced, a reversible linear actuator connected with said pivoted arm and arranged to move the latter in a direction along the length of the belt, sensing means contacting an edge of said belt and controlling the movement of said pivoted arm and the lateral angular position of the rollers mounted therein.

2. In a stabilizer as defined in claim 1, the construction wherein at least one of said rollers is received in slots in said arms at least partially perpendicular to the lower reach of said belt and spring means applying pressure to said roller in a direction to apply constant tension in the belt.

3. In a stabilizer as defined in claim 1 and wherein said multiple rollers mounted in said arms are at least three in number and arranged in staggered relation whereby the belt contact area of the rollers equal substantially 100% of the surface area of one of the said rollers.

References Cited

UNITED STATES PATENTS

| | | | |
|---|---|---|---|
| 2,600,273 | 6/1952 | Seifried | 198—202 X |
| 3,159,268 | 12/1964 | Dyke | 198—202 |
| 3,407,673 | 10/1968 | Slezak | 226—23 X |

FOREIGN PATENTS 90,976 12/1957 Norway.

EDWARD A. SROKA, Primary Examiner

U.S. Cl. X.R.

74—241; 226—23